United States Patent [19]

Nielsen et al.

[11] 4,145,647

[45] Mar. 20, 1979

[54] ARRANGEMENT FOR CONTROLLING THE SPEED AND ROTARY DIRECTION OF A THREE-PHASE ASYNCHRONOUS MOTOR

[75] Inventors: Kaj Nielsen, Nordborg; Nils H. Nygaard, Sonderborg, both of Denmark

[73] Assignee: Danfoss A/S, Denmark

[21] Appl. No.: 880,636

[22] Filed: Feb. 23, 1978

[51] Int. Cl.$^2$ ............................................. H02P 5/40
[52] U.S. Cl. .................................................... 318/810
[58] Field of Search ........................ 318/227, 230, 231

[56] References Cited

U.S. PATENT DOCUMENTS

| | | | |
|---|---|---|---|
| 3,691,439 | 9/1972 | Jensen et al. | 318/227 |
| 3,700,989 | 10/1972 | Jensen | 318/227 |
| 3,887,862 | 6/1975 | Hübner | 318/227 X |
| 3,939,387 | 2/1976 | Maeda | 318/227 |

*Primary Examiner*—Gene Z. Rubinson
*Attorney, Agent, or Firm*—Wayne B. Easton

[57] ABSTRACT

The invention relates to a DC control circuit for controlling the speed and rotary direction of a three-phase asynchronous motor. The circuit has an inverter section having three branches with a pair of switch elements in series in each of the branches. The inverter section has a common extinguishing switch element in shunt with the three branches. A speed determining frequency generator is responsive to the voltage of the DC supply and an ignition signal generator for operating the inverter switch elements is driven by the frequency generator. An extinction signal generator for operating the common extinguishing switch element is also driven by the frequency generator. A reversing circuit section between the ignition signal generator and the inverter branches has two states for exchanging the control lines of the inverter switch elements in at least two of the branches. A latching unit for selecting either of the two reversing states is connected to and subservient to the frequency generator to prevent initiations of reversals prior to the operation of the extinguishing switch element during each cycle of operation.

2 Claims, 1 Drawing Figure

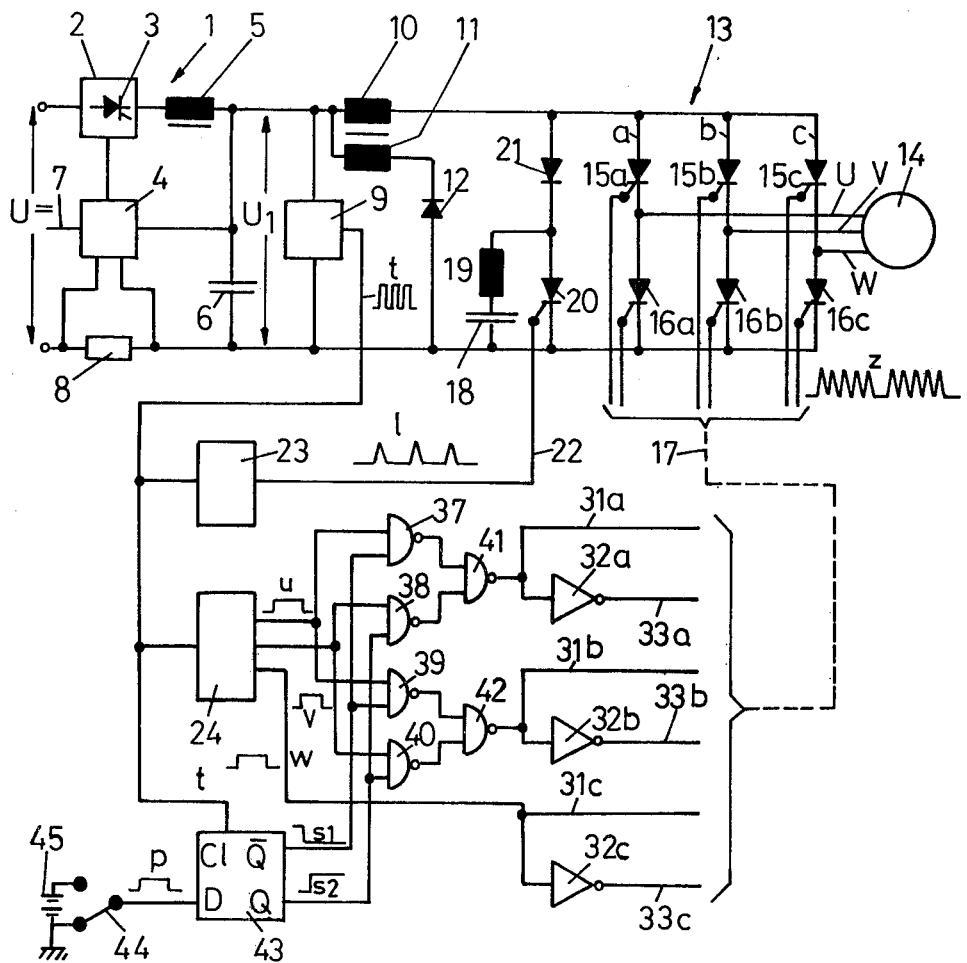

ARRANGEMENT FOR CONTROLLING THE SPEED AND ROTARY DIRECTION OF A THREE-PHASE ASYNCHRONOUS MOTOR

The invention relates to an arrangement for controlling the speed and rotary direction of a three-phase asynchronous motor energised by a controllable DC supply by way of a short-circuiting impedance and an inverter, the controllable DC voltage being lowerable on reaching a limiting current, comprising a frequency generator determining the speed, an ignition signal generator influenced thereby and connected by control lines to inverter switch elements which are arranged in series in pairs in at least three branches, and an extinction signal generator also influenced thereby for controlling a common extinguishing switch element, and a reversing circuit which influences the rotary direction for exchanging the control lines of the inverter switch elements of at least two branches.

In a known arrangement of this kind, the DC voltage supply comprises a vibrator in the form of a controllable rectifier which permits a constant DC voltage in the form of impulses of different width and/or different frequency to pass so that, with the aid of a downstream smoothing circuit, a controllable DC voltage is produced. The latter is determined by a desired voltage value but, when the current reaches a predetermined limiting value, is reduced to such an extent that this current is not exceeded. The rotary speed is determined with the aid of a frequency generator which is independent of the voltage control and which is combined with an ignition signal generator and an extinction signal generator. The extinction signal generator delivers extinguishing pulses at a frequency six times as large as the desired frequency. The ignition signal generator is connected to the inverter switch elements of three branches by way of three pairs of control lines. In the case of two pairs, the connections can be interchanged by a reversing circuit.

During normal operation, one inverter switch element, e.g. a controlled rectifier, in each branch is brought to the conductive state, for example by a high-frequency signal that exists during a pass period. If, now, the control lines are exchanged, the respective second switch element of the branch is also made conductive without the first-mentioned switch elements being extinguished. The short-circuiting current that then flows might still be permissible initially because of the short-circuiting impedance but it rapidly increases to reach impermissibly high values. On occurrence of the short-circuiting current, the voltage of the DC voltage supply is reduced but the energy stored in the smoothing condenser and in the short-circuiting impedence may already be sufficient to destroy the switch elements. Since the asynchronous motor cannot discharge any energy, it continues to run without braking, this causing the reversal of rotation to be delayed.

It is also known to bring the frequency of the frequency generator of the controllable voltage to the output of the DC voltage supply because for optimum operation of the asynchronous motor its voltage and frequency are to be at a substantially constant ratio to one another. If one were to employ the aforementioned reversing circuit in such an arrangement, even graver problems would arise. When the controllable voltage is reduced on the occurrence of a short-circuiting current, the given frequency drops simultaneously. This means that the time up to the occurrence of the next extinction becomes still larger, i.e. the short-circuiting current flows still longer.

The invention is based on the problem of providing an arrangement of the aforementioned kind in which the short-circuiting problems arising in connection with the reversal of direction are avoided or negligible and reversal can be effected at any desired speed without first reducing the speed.

This problem is solved according to the invention in that the reversing circuit is associated with a latching device which prevents the initiated reversal until the instant of the next following extinction, and that the frequency of the frequency generator is made proportional to the controlled DC voltage.

The latching device ensures that reversal always coincides with extinction or takes place immediately prior thereto. The condition in which both switch elements of a branch are simultaneously conductive therefore fails to occur or at the most takes place during a harmlessly short time. Destruction of the switch elements is therefore excluded. In addition, immediately after reversal the motor is applied to live terminals which give rise to a rotary field corresponding to the new direction of rotation. Since the motor is still running in the previous direction, it functions as a generator and is rapidly braked accordingly.

The high currents occurring during reversal and leading to a drop in the controllable DC voltage also result in a reduction of the frequency. This permits the asynchronous motor to accelerate in the opposite direction without the flow of higher currents than those permissible by the maximum current limit which generally restricts the motor current to substantially the normal full-load current. The danger of a short-circuiting current flowing through the individual branches for an excessively long time by reason of the delay in the extinguishing step is excluded by the use of the latching device.

A particularly simple circuit is obtained if the frequency generator delivers a sequence pulse for releasing the latching device at each instant of extinction. In this way the synchronism between the extinguishing and reversal steps is obtained. In the simplest case, the sequence pulse is identical with the extinction pulse.

In a preferred embodiment it is ensured that the latching device delivers one of two alternatively occurring reversing signals in response to a supplied phase reversal signal but permits a signal change only on the next following extinction, and that the reversing circuit has in each branch to be reversed two electronic switch elements in which the ignition signals of each phase of the ignition signal generator are interlinked after an AND function with a respective one of the two reversing signals. By interlinking the ignition signals with the reversing signals and delivery of the reversing signals at the correct time, the reversing step is synchronised with the extinction step.

In particular, the latching device may be a D flip-flop of which the D input is fed with the phase reversal signal, the sequence input is fed with a sequence pulse of the frequency generator and at the two outputs of which the two reversing signals are derived. The phase reversal signal can, for example, be a rectangular signal having the value 1 for one direction of rotation and the value 0 for the other direction.

The invention will now be described in more detail with reference to an example illustrated in the drawing.

The single FIGURE illustrates a simplified circuit diagram of the arrangement according to the invention.

A controllable DC voltage supply 1 is fed with a constant DC voltage U=. A series regulator 2 comprises a controlled rectifier 3 functioning as a vibrator for which the control signals are supplied by a control device 4 in such a way that DC pulses of different width and/or frequency are allowed to pass. A downstream smoothing circuit comprises a longitudinal choke 5 and a transverse condenser 6. Consequently a controllable DC voltage U1 is produced. This is normally brought to a desired value which is given at the control device 4 by a setting device 7. If, however, the current in the system reaches a predetermined limiting value, which can be detected by the voltage drop at a measuring resistor 8, the control device 4 reduces the voltage U1 so that no excessively high currents can occur. Also depending on the voltage U1 there is a frequency generator 9 which delivers sequence pulses t having a frequency six times as large as the frequency associated with the voltage U1. This frequency generator 9 is in the form of a known voltage-controlled oscillator (VCO).

An inverter 13 is connected by way of a short-circuiting impedence 10, which also serves to recover energy during the extinguishing step with the aid of a transformer winding 11 and a rectifier 12. The inverter 13 feeds a three-phase asynchronous motor 14. The inverter comprises three branches a, b and c which each comprise two series-connected switch elements 15a and 16a, 15b and 16b as well as 15c and 16c, between which the three phase connections U, V and W are branched off. The control electrodes of the switch elements in the form of controlled rectifiers are fed with high frequency ignition pusles z by way of control lines 17. For the sake of simplicity, other components of the inverter such as free-wheeling diodes and the like are omitted.

An extinction circuit comprises a condenser 18, a turning choke 19, an extinction switch element 20 in the form of a controlled rectifier and a diode 21. The control electrode of the switch element 20 is fed by way of a control line 22 from an extinction pulse generator 23 with extinction pulses 1 which are initiated by a respective sequence pulse t and thus have a frequency corresponding to six times the desired frequency.

The sequence pulses t also control an ignition signal generator which may be of any desired construction and comprise for example flip-flops, frequency dividers, counting circuits etc. Ignition signals u, v and w corresponding to the desired phase voltages at the outputs U, V and W are produced at the outputs. The ignition signal w is passed on directly and the ignition signals u and v are fed by way of a reversing circuit 30. They are then passed, partly directly and partly by way of a NOT element 32a, 32b or 32c, to lines 31a to c and 33a to c to deliver the ignition pulses in the lines 17. For example, they can be combined with a permanently transmitted high-frequency signal, e.g. 200 kHz. This high frequency signal therefore always occurs in the lines 17 if an input signal depending on the ignition signals u, v and w is also present in the lines 31a to c and 33a to c.

The reversing circuit 30 comprises two first NAND elements 37, 38 and 39, 40 as well as a second NAND element 41 and 42 for each phase. There is also a latching device 43 in the form of a D flip flop of which the D input is selectively applied by way of a switch 44 to earth or to the voltage of a voltage source 45 so that the D input is fed with a phase reversal signal p having the value 1 for one direction of rotation and the value 0 for the other direction. Each of the two values is associated with a reversing signal s1 at the $\bar{Q}$ output or s2 at the Q output. However, a reversal at the outputs takes place only on the occurrence of a sequence pulse p at the sequence input c1. This means that the phase reversal signal p can be given at a desired instant but a change of the reversal signals s1 and s2 only on the occurrence of the sequence pulse t which simultaneously brings about extinction by way of the extinction signal generator 23. Depending on these reversing signals s1 and s2, either the NAND elements 37 and 39 or the NAND elements 38 and 40 becomes effective so that the branch a is selectively controlled by the ignition signal u or v and the branch b selectively by the ignition signal v or u, which corresponds to a reversal in the direction of rotation.

Assuming that the reversing signal s1 is present, the circuit then operates so that the phase voltages occur in the sequence U, V and W. If the switch 44 is operated, a change in the reversing signal to s2 will take place during the next sequence pulse t. The phase voltages will now be controlled in order V, U, W, which corresponds to a reversal of the rotary field in the motor 14. Since the reversal takes place at the instant of extinction, no short circuit need be feared in the branches a, b and c. Immediately after this reversal, the motor will act as a generator and is therefore braked. Because of the currents that arise, the voltage U1 is reduced, whereby the frequency generator 9 will also drop.

As soon as the motor 14 has come to rest, it will immediately accelerate in the opposite sense, the voltage U1 and the frequency then increasing up to the desired value.

Numerous modifications are possible. For example, the latching device may also be initiated by an extinction pulse. The NAND elements may also be replaced by AND elements, and vice versa, if the circuit is adapted accordingly.

We claim:

1. A circuit for controlling the speed and rotary direction of a three-phase asynchronous motor, comprising, controllable DC voltage supply means, means responsive to limiting current for reducing the voltage of said supply means, three-phase inverter means connected to said DC supply means having three branches with a pair of switch elements in series in each of said branches, said inverter means including a common extinguishing switch element in shunt with said three branches, a speed determining frequency generator responsive to the voltage of said DC supply means, an ignition signal generator driven by said frequency generator for operating said inverter switch element, an extinction signal generator driven by said frequency generator for operating said common extinguishing switch element, reversing circuit means between said ignition signal generator and said inverter branches having two states for exchanging the control lines of said inverter switch elements in at least two of said branches, latching means for selecting either of said reversing circuit means states, said latching means being connected to and subservient to said frequency generator to prevent initiations of reversals prior to the operation of said extinguishing switch element during each cycle of operation.

2. A circuit according to claim 1 wherein said latching means includes a D flip-flop of which the D input is for a phase reversal signal and the sequence input is for a sequence pulse of said frequency generator, said D flip-flop having two outputs of which the two reversing signals are derived.

* * * * *